Apr. 10, 1923.
L. W. BUGBEE
1,451,490
PROCESS OF MAKING BIFOCAL LENSES
Filed Apr. 8, 1922
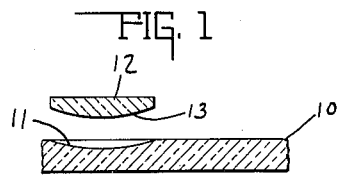
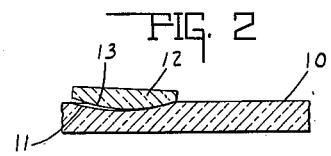
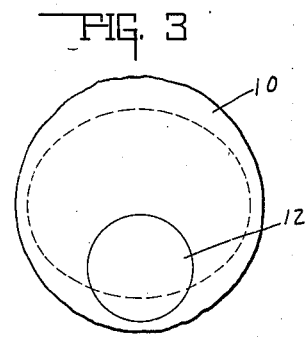
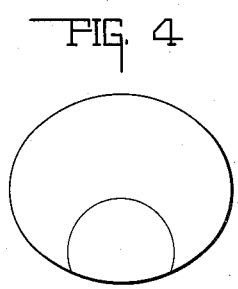
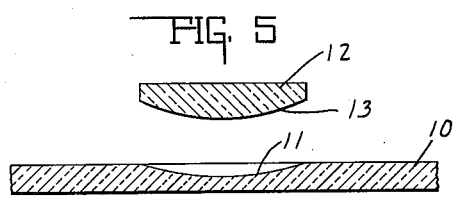
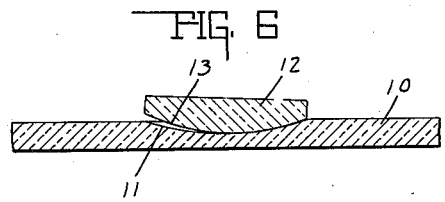
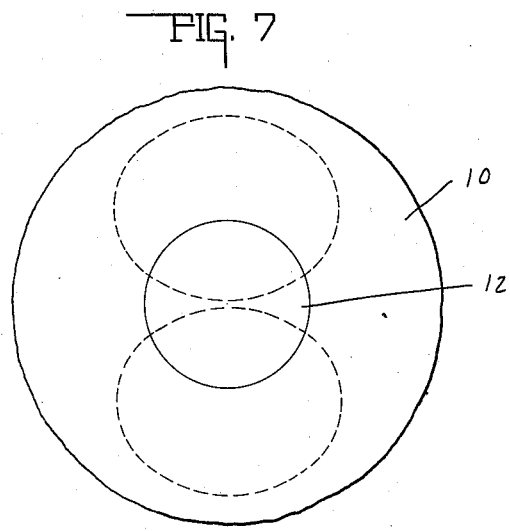
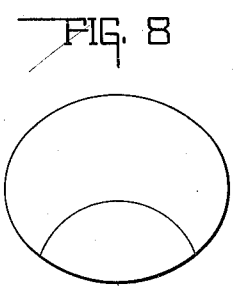
INVENTOR.
LUCIAN W. BUGBEE.
BY
ATTORNEYS.

Patented Apr. 10, 1923.

1,451,490

UNITED STATES PATENT OFFICE.

LUCIAN W. BUGBEE, OF INDIANAPOLIS, INDIANA, ASSIGNOR TO FRANKLIN OPTICAL COMPANY, OF INDIANAPOLIS, INDIANA, A CORPORATION OF INDIANA.

PROCESS OF MAKING BIFOCAL LENSES.

Application filed April 8, 1922. Serial No. 550,843.

*To all whom it may concern:*

Be it known that I, LUCIAN W. BUGBEE, a citizen of the United States, and a resident of Indianapolis, county of Marion, and State of Indiana, have invented a certain new and useful Process of Making Bifocal Lenses; and I do hereby declare that the following is a full, clear, and exact description thereof, reference being had to the accompanying drawings, in which the numerals refer to like parts.

This invention relates to a fused bifocal ophthalmic lens, and the process of making the same without seriously injuring the fused surfaces.

It is the object of this invention to fuse or weld bifocal lenses so that there will be maximum definition as compared with the present fused bifocals, in the manner and by the method to be hereinafter more fully described.

It has heretofore been customary to grind and polish a concave depression in a piece of glass of relatively low refractive index, to be hereinafter termed the major portion of the lens or crown glass. In making the fused bifocal, a button of glass of relatively high refractive index, commonly known as flint glass, and having a convex surface ground and polished upon one side thereof, is seated in the concave depression of the major portion and fused therein, the concave depression and the convex surface of the button having substantially the same radius of curvature.

In practice the convex surface is made of slightly less radius of curvature than the concave surface so as to permit any air contained between the two surfaces to be forced out as they are fused together, thereby eliminating air bubbles. It is furthermore, customary to place the glass of low refractive index or major portion or crown glass upon an infusible block of carborundum or similar material, the surface having the concave depression being on the upper side. Into this depression is placed the glass of high refractive index or the flint button, the convex portion thereof being in contact with the concave surface of said major portion. Both are then slowly heated up to about 1050 degrees Fahrenheit, which is the approximate temperature at which the flint becomes softened and becomes plastic, the softening point of the crown or major portion being at a considerably higher temperature. Therefore, at substantially 1050 degrees Fahrenheit, the flint button slowly sinks down and the flint surface welds or fuses to the crown or major portion. Thereafter both surfaces of the blank, including both the flint button and the major portion, are ground and polished to the required curvatures or dioptral powers to produce the finished bifocal.

A bifocal lens as above described possesses a serious lack of definition as compared with a bifocal lens ground out of one piece of glass. Part of the loss of definition is due to chromatic aberration and it can easily be proved by experiment that a large part of it is due to injury done to the contacting surfaces of flint and crown glass during the fusing process.

When a glass surface is polished there is inevitably a certain amount of surface flow set up during the polishing operation. In fact, it is customary in polishing a bifocal surface frequently to allow the polisher to become almost dry in order to produce the maximum amount of friction and, therefore, the maximum of surface flow in order to hasten the polishing operation, thereby shortening the time necessary to produce such a surface. A surface so produced must necessarily be under strain. If the lens is split in section and examined edgewise close to the surface with a powerful polariscope, the strain will be apparent. However, no serious harm results from this surface strain in the ordinary type of lens, but in the so-called fused bifocal it is indirectly the cause of a large amount of lack of definition, which it is the purpose of this invention to overcome and eliminate. It is obvious that during the fusing or welding operation, this strain is released and each molecule, composing the surface layer, returns to its original position. Furthermore, minute scratches, which were invisible to the eye after the polishing operation, will open up and become plainly visible during the fusing operation, thus further proving the existence of surface flow during the polishing operation and the return of the glass to its original condition during the fusing operation. The unevenness thus produced is aggravated by the filling in of the undulations or openings by the dense flint glass of high refractive index and relatively great dispersion. If two bifocal lenses are made of flint and crown, each being exactly similar in every way, excepting that in one case the contacting surfaces are fused or welded and in the other they are cemented by Canada balsam and each are used as camera objectives, the cemented lens will be found to give definition greatly superior to the fused or welded lens, each having exactly the same amount of chromatic aberration. The difference is in the injury done during the fusing.

Therefore, the object of this invention is to give superior definition to the fused or welded lens so that it will have substantially an equal definition to the bifocal lens formed by cementing or grinding from a single piece of glass. In doing this, the surface flow, undulations, scratches, etc., which are aggravated by fusing or welding, are removed and eliminated by a second polishing process, after being highly heated and carefully annealed, before the fusing. The second polishing process will remove such undulations brought out in the annealing process, and thereby producing the above-mentioned surface flow.

The full nature of the invention will be understood from the accompanying drawings and the following description and claims:

In the drawings, Figure 1 is a section through a portion of crown glass constituting the major portion having a concave surface, above which is the flint button adapted to be fused or welded thereto. Fig. 2 is a section taken through the same in their respective positions while being fused or welded. Fig. 3 is a plan view of the blank with the button fused or welded in the major portion thereof. Fig. 4 is a plan view of the finished lens. Figs. 5, 6, 7 and 8 are the same as Figs. 1, 2, 3 and 4, respectively, with the exception that the latter figures illustrate a double blank from which two lenses are cut, as indicated by dotted lines in Fig. 7.

In the drawings there is shown a major portion or crown glass blank 10 having a concave surface 11 and a flint button 12 having a convex surface 13 of substantially the same radius. However, in actual practice it is preferable to form the convex surface 13 with a slightly lesser radius than the concave surface 11 so that in fusing the two surfaces together the air between them will be permitted to escape so as to prevent the formation of air bubbles therein. Both surfaces are ground and polished in the regular and well known manner, excepting that it is desirable to use polishing methods which are known by lense experts to give the greatest removal of glass with minimum surface flow. Generally speaking, this consists in pitch polishing and keeping the surface wet instead of felt polishing and running the surfaces nearly dry, as is the ordinary commercial process.

The next step in the process is to heat both the flint button and crown glass portion to approximately 1050 degrees Fahrenheit so as to release strain in the surface and permit each molecule composing the surface layer to return to its original position and cause any minute scratches to open up and all unevenness, due to the surface flow and strain, to be brought out, as above described, which usually occurs during the fusing operation.

The button and flint are then carefully annealed or cooled, and the surfaces, which are then very slightly undulating, are repolished as before, excepting that a very slight amount of polishing is necessary to remove the undulations caused by heating and annealing, whereas a relatively greater amount of polishing was necessary to remove the irregularities caused by grinding. Therefore, the amount of surface strain after the repolishing operation is infinitesimal as compared with that set up during the original polishing. This leaves the surfaces in a polished condition, without the previous surface flow or strain to any appreciable degree, so that upon fusing, the surfaces remain substantially unaffected.

The flint button is then fused or welded in the concave portion of the crown glass blank by the usual methods which are well known in the art and need not be described in detail herein. There being practically no surface strain or surface flow, and the minute scratches, abrasions and undulations having been polished from the surface subsequent to the heating and annealing and prior to the fusing or welding, no noticeable loss of definition results from the old and well known process of making fused bifocal lenses. With this process the definition of a fused bifocal lens is more nearly equal to that of the cemented bifocal lens, or the bifocal ground from a single piece of glass.

Both surfaces of the blank comprising the combined flint button and crown glass portion are ground and polished to their required curvatures or dioptral powers after fusing, and are cut to produce the finished lens shown in Fig. 4.

In addition to producing bifocal lenses in the above-described manner, a fine optical surface may be made substantially as above described. In the ordinary instrument lens it would be advantageous to use such surface to improve said lens for the reason that the surface strain tends to disappear in said lenses in the course of time at ordinary temperatures, and obviously must affect the definition somewhat although not to the extent that would be obtained if the resulting inequalities were filled with dense flint. However, if a dense flint lens of a high refractive index, in which such strain had been gradually released, was cemented to another lens with Canada balsam with its low refractive index, then such defect might become noticeable. Therefore, this process may be applied to such a lens by first grinding and polishing the same, heating it to such temperature as will substantially release the surface strain, annealing by slowly cooling the surface and then repolishing the same.

The invention claimed is:

1. The process of making a bifocal lens having two contacting pieces of glass of different refractive indexes, consisting of grinding and polishing the contacting surfaces thereof, heating one of said surfaces, repolishing said surface, and then uniting the same with the other surface by fusing or welding in the usual manner.

2. The process of making a bifocal lens having two contacting pieces of glass of different refractive indexes, consisting of grinding and polishing the contacting surfaces thereof, heating one of said surfaces to a temperature sufficient to release the surface strain, annealing the same by cooling, repolishing said surface, and then uniting said surface to the other surface by fusing or welding in the usual manner.

3. The process of making a bifocal lens having two contacting pieces of glass of different refractive indexes, consisting of grinding and polishing the contacting surfaces thereof, heating one of said surfaces to substantially 1050 degrees Fahrenheit, annealing the same by cooling, repolishing said surface and thereafter uniting both surfaces by fusing or welding the same in the usual manner.

4. The process of making a bifocal lens having two contacting pieces of glass of different refractive indexes, consisting of grinding and polishing the contacting surfaces thereof, heating one of said surfaces, annealing the same, repolishing said surface, and then uniting said surface to the other surface by fusing or welding in the usual manner.

5. The process of making a bifocal lens having two contacting pieces of glass of different refractive indexes, consisting of grinding and polishing the contacting surfaces thereof, heating said surfaces, annealing the same, repolishing said surfaces, and then uniting said surfaces by fusing or welding in the usual manner.

6. The process of making a bifocal lens having a flint glass button with a convex surface and a crown glass portion with a concave surface, said surfaces being of substantially the same radius, consisting of grinding and polishing said surfaces, heating both of said surfaces to a temperature sufficient to release the surface strain or substantially 1050 degrees Fahrenheit, then annealing said surfaces by cooling the same, repolishing said surfaces, and thereafter uniting them by fusing or welding in the usual manner.

7. The process of producing a fine optical surface consisting of grinding and polishing said surface, heating the same to a temperature sufficient to release or substantially release such surface strain as may exist therein, annealing said surface by the cooling thereof and thereafter repolishing the same.

8. The process of making a bifocal lens having two contacting pieces of glass of different refractive indexes, consisting of grinding and polishing the contacting surfaces thereof, heating one of said surfaces, repolishing said surface, then uniting the same with the other surface by fusing or welding in the usual manner, surfacing the non-contacting surfaces thereof, and finishing the same to form a finished lens.

9. The process of making a bifocal lens consisting of forming an annular concave recess in a glass blank of relatively low refractive index, forming a button of glass having a relatively high refractive index provided with a convex surface of substantially the same radius as said concave surface, grinding and polishing said convex and concave surfaces, heating the same to a temperature sufficient to substantially release the surface strain thereof, annealing said surfaces by cooling, repolishing said surfaces, uniting the surfaces by fusing or welding the same in the usual manner, cutting said blank into a plurality of blanks, grinding and polishing the outer surfaces and cutting and edging to form finished lenses.

In witness whereof, I have hereunto affixed my signature.

LUCIAN W. BUGBEE.